United States Patent
Chu et al.

(10) Patent No.: US 11,669,742 B2
(45) Date of Patent: Jun. 6, 2023

(54) PROCESSING SENSOR DATA WITH MULTI-MODEL SYSTEM ON RESOURCE-CONSTRAINED DEVICE

(71) Applicant: Google LLC, Mountain View, CA (US)

(72) Inventors: Chun-Te Chu, Bellevue, WA (US); Claire Jaja, Seattle, WA (US); Kara Vaillancourt, Seattle, WA (US); Oleg Veryovka, Seattle, WA (US)

(73) Assignee: Google LLC, Mountain View, CA (US)

( * ) Notice: Subject to any disclaimer, the term of this patent is extended or adjusted under 35 U.S.C. 154(b) by 375 days.

(21) Appl. No.: 16/950,275

(22) Filed: Nov. 17, 2020

(65) Prior Publication Data

US 2022/0156589 A1 May 19, 2022

(51) Int. Cl.
| | | |
|---|---|---|
| *G06N 20/20* | (2019.01) | |
| *G06N 3/082* | (2023.01) | |
| *G06F 18/214* | (2023.01) | |
| *G06F 18/21* | (2023.01) | |
| *G06F 18/20* | (2023.01) | |
| *G06N 3/045* | (2023.01) | |

(52) U.S. Cl.
CPC ........... *G06N 3/082* (2013.01); *G06F 18/214* (2023.01); *G06F 18/217* (2023.01); *G06F 18/285* (2023.01); *G06N 3/045* (2023.01); *G06N 20/20* (2019.01)

(58) Field of Classification Search
CPC ........ G06N 3/08; G06N 20/20; G06F 18/217; G06F 18/285; G06F 18/214
USPC .......................................................... 706/25
See application file for complete search history.

(56) References Cited

U.S. PATENT DOCUMENTS

| | | |
|---|---|---|
| 2017/0215011 A1 | 7/2017 | Goldstein |
| 2019/0140911 A1* | 5/2019 | Jain ...................... H04L 43/022 |
| 2020/0245938 A1 | 8/2020 | Xu et al. |

(Continued)

OTHER PUBLICATIONS

Maxwell et al., "Implementation of machine-learning classification in remote sensing: an applied review", International Journal of Remote Sensing, 2018, vol. 39, No. 9, 2784-2817 (Year: 2018).*

(Continued)

*Primary Examiner* — Tsu-Chang Lee
(74) *Attorney, Agent, or Firm* — Colby Nipper PLLC

(57) ABSTRACT

Methods, systems, and computer-readable media for multi-model processing on resource-constrained devices. A resource-constrained device can determine, based on a battery-life for a battery of the device, whether to process input through a first model or a second model. The first model can be a gating model that is more energy efficient to execute, and the second model can be a main model that is more accurate than the gating model. Depending on the current battery-life and/or other criteria, the system can process, through the gating model, sensor input that can record activity performed by a user of the resource-constrained device. If the gating model predicts an activity performed by the user that is recorded by the sensor data, the device can process the same or additional input through the main model. Overall power consumption can be reduced with a minimum accuracy maintained over processing input only through the main model.

20 Claims, 5 Drawing Sheets

(56) References Cited

U.S. PATENT DOCUMENTS

2022/0344060 A1* 10/2022 Kristal .................. G16H 50/50

OTHER PUBLICATIONS

Abdelkareem Bedri, et al., EarBit: Using Wearable Sensors to Detect Eating Episodes in Unconstrained Environments, ACM on Interactive, Mobile, Wearable and Ubiquitous Technologies, vol. 1, No. 3, Article 37., Sep. 2017, 20 pages.
Davis, Alan and Sven Nordholm. A Low Complexity Statistical Voice Activity Detector with Performance Comparisons to ITU-T / ETSI Voice Activity Detectors. ICICS-PCM 2003. Jan. 15, 2004. 6 pages.
Zhang, Li et al. AccelWord: Energy Efficient Hotword Detection through Accelerometer MobiSys '15: Proceedings of the 13th Annual International Conference on Mobile Systems, Applications, and Services. May 2015. pp. 301-315.
Park, Jinsoo et al. Voice Activity Detection in Noisy Environments Based on Double-Combined Fourier Transform and Line Fitting. The Scientific World Journal, vol. 2014. Aug. 6, 2014. 12 pages.
Abdull Sukor, A. S. et al. Activity recognition using accelerometer sensor and machine learning classifiers. 2018 IEEE 14th International Colloquium on Signal Processing & Its Applications (CSPA). Apr. 2018. pp. 233-238.
Cournapeau, David et al. Online Unsupervised Classification With Model Comparison in the Variational Bayes Framework for Voice Activity Detection. IEEE Journal of Selected Topics in Signal Processing, vol. 4, Issue 6. Dec. 2010. pp. 1071-1083.

* cited by examiner

PROCESSING SENSOR DATA WITH MULTI-MODEL SYSTEM ON RESOURCE-CONSTRAINED DEVICE

BACKGROUND

Neural networks are machine learning models organized into two or more layers of smaller models (or "layers") each configured to process one or more inputs and to generate one or more outputs. The inputs can come from a previous layer, somewhere external to the neural network, e.g., an initial input or a predetermined value, or both. Each layer can include one or more activation functions that can process incoming input with one or more model parameter values, e.g., weight values or bias values. A neural network can be trained according to a learning algorithm to learn model parameter values that cause the neural network to generate outputs that are more accurate relative to a desired result or known true value for a given input.

A computing device can be configured to receive input, to process the input through one or more machine learning models, and to generate output corresponding to the input. In some cases, machine learning models can be very large, e.g., hundreds or thousands of layers with many model parameter values per layer. Machine learning models of this magnitude often require a proportional amount of computational power to process. Some computing devices are resource-constrained, meaning that the devices are limited in available power for processing and/or lack sufficient processing or storage capacity to process larger models.

Even if a computing device is capable of processing a computationally-taxing model, doing so is not always desirable, particularly when conserving battery life of the device for extended use in performing a wide variety of functions is favored. In some cases, hardware limitations or the cost to implement specialized hardware prevent designing and/or manufacturing a resource-constrained device with improved hardware. Even if adding improved hardware to the device is possible, doing so can require sacrificing other important features of the device, e.g., its form factor, size, weight, or cost to a user to own and operate. For computing devices that are wearable devices, e.g., wireless earbuds, headphones, or glasses, this trade-off between augmentation and other design features can be particularly important.

BRIEF SUMMARY

In general, this specification relates to a multi-model system implemented on a computing device and techniques for processing input to the system in a resource-efficient manner A multi-model system includes a gating model and a main model that are trained to perform a machine learning task with respective average accuracies relative to a minimum accuracy threshold. An example machine learning task is a classification task, e.g., classifying input to predict an activity, e.g., a user speaking, recorded in the input. Activities detected can include whether or not a user of the computing device is talking, and if so, the contents of their speech. The multi-model system can balance resource consumption with accuracy of the multi-model system to perform a particular machine learning task.

The minimum accuracy threshold represents a tolerance for error for the computing device to perform the machine learning task without substantively affecting a user's experience in operating the computing device.

The system can process input initially through the gating model. If the gating model generates an output of a positive classification, e.g., the detection of an activity, then the system can process the same or subsequent input through the main model. The gating model is trained to generate output that on average meets the minimum accuracy threshold, but consumes less energy from the battery of a computing device relative to the main model to do so. Power consumption can be measured, for example, by relative numbers of operations to process the gating model and the main model, or relative runtimes during inference as between the two models.

When the gating model generates an output, the main model can take over processing or process input with higher accuracy. Because the generally more computationally-taxing main model can run when prompted by output from the gating model, the overall resource consumption of the system can be lowered than if the main model always runs during inference. This is at least because the main model is not invoked for input in which no activity or classification target of interest was recorded. In this way, the user can still benefit from (prolonged) use of the computing device configured to perform a variety of tasks.

The system can adapt to raise or lower overall accuracy of the system depending on the remaining battery-life for the computing device. While the system adaptively adjusts whether to process through the gating model or the main model, the system maintains the minimum accuracy threshold, which is tuned to allow a rate of error in performing a given task by the system that can be imperceptible to users operating the device.

In general, one innovative aspect of the subject matter described in this specification provides for a computing device including a battery, and one or more processors configured to obtain first sensor input from one or more first sensors, and determine, based on at least a battery-life of the battery, whether to process the first sensor input through a first machine learning model or a second machine learning model. The first machine learning model can be trained to generate output with an average accuracy meeting a minimum accuracy threshold, and the second machine learning model can be trained to generate output with an average accuracy exceeding the minimum accuracy threshold. In response to determining to process the first sensor input through the first machine learning model, the computing device can be further configured to generate a first output using the first machine learning model, the first output predicting whether the first sensor input recorded an activity.

The one or more processors can be further configured to: when the first machine learning model predicts that the first sensor input recorded an activity, process second sensor input obtained from one or more second sensors through the second machine learning model to generate a second output predicting whether the second sensor input recorded the activity.

The first machine learning model can require fewer operations to process the first sensor input than the second machine learning model requires to process the second sensor input.

The second sensor can be different from each of the one or more first sensors.

The first sensor input can be obtained from a first sensor of the one or more first sensors operating at a first power level. The second sensor input can be at least partially obtained from the first sensor operating at a second power level higher than the first power level.

The computing device can further include a display, and the one or more processors can be further configured to determine, from the second output, that the second machine learning model predicted that the second sensor input recorded an activity, and in response generate and transmit a third output to a display of the computing device.

The one or more processors can be further configured to receive one or more performance thresholds corresponding to an average measure of performance for the first machine learning model under respective one or more conditions and that are equal to or greater than the minimum average threshold. The one or more processors can be further configured to receive a current battery-life of the battery indicating a change in available energy stored in the battery; and determine, based at least on the current battery-life, whether to cause the first machine learning model to perform at a level of performance meeting a performance threshold of the one or more performance thresholds. In response to the determination to cause the first machine learning model to perform at the level of performance, the one or more processors can cause the first machine learning model to operate under respective one or more conditions for the performance threshold.

The one or more processors can be further configured to receive one or more performance thresholds corresponding to an average measure of performance for the first machine learning model under respective one or more conditions and that are equal to or greater than the minimum average threshold; receive a current battery-life of the battery indicating a change in available energy stored in the battery; and determine, based at least on the current battery-life, whether to cause the first machine learning model to perform at a level of performance meeting a performance threshold of the one or more performance thresholds. In response to the determination to cause the first machine learning model to perform at the level of performance, the one or more processors can cause the first machine learning model to operate under respective one or more conditions for the performance threshold.

The first machine learning model and the second machine learning model can be trained to perform a machine learning task, wherein the machine learning task can include detecting a plurality of types of activities recorded by at least one sensor of the one or more first sensors and the one or more second sensors. The first machine learning model can be trained to detect at least one type of the plurality of types with an average accuracy greater than the second machine learning model.

The first and the second machine learning models can be neural networks, the first machine learning model having a first plurality of layers, and the second machine learning model having a second plurality of layers that is a subset of the first plurality of layers.

The first machine learning model can be of a different model architecture than the second machine learning model.

Other implementations of the foregoing aspect can include a computer-implemented method, an apparatus, and computer programs recorded on one or more computer-readable storage media.

BRIEF DESCRIPTION OF THE DRAWINGS

Like reference numbers in the drawings indicate like elements.

DETAILED DESCRIPTION

Figure 1:
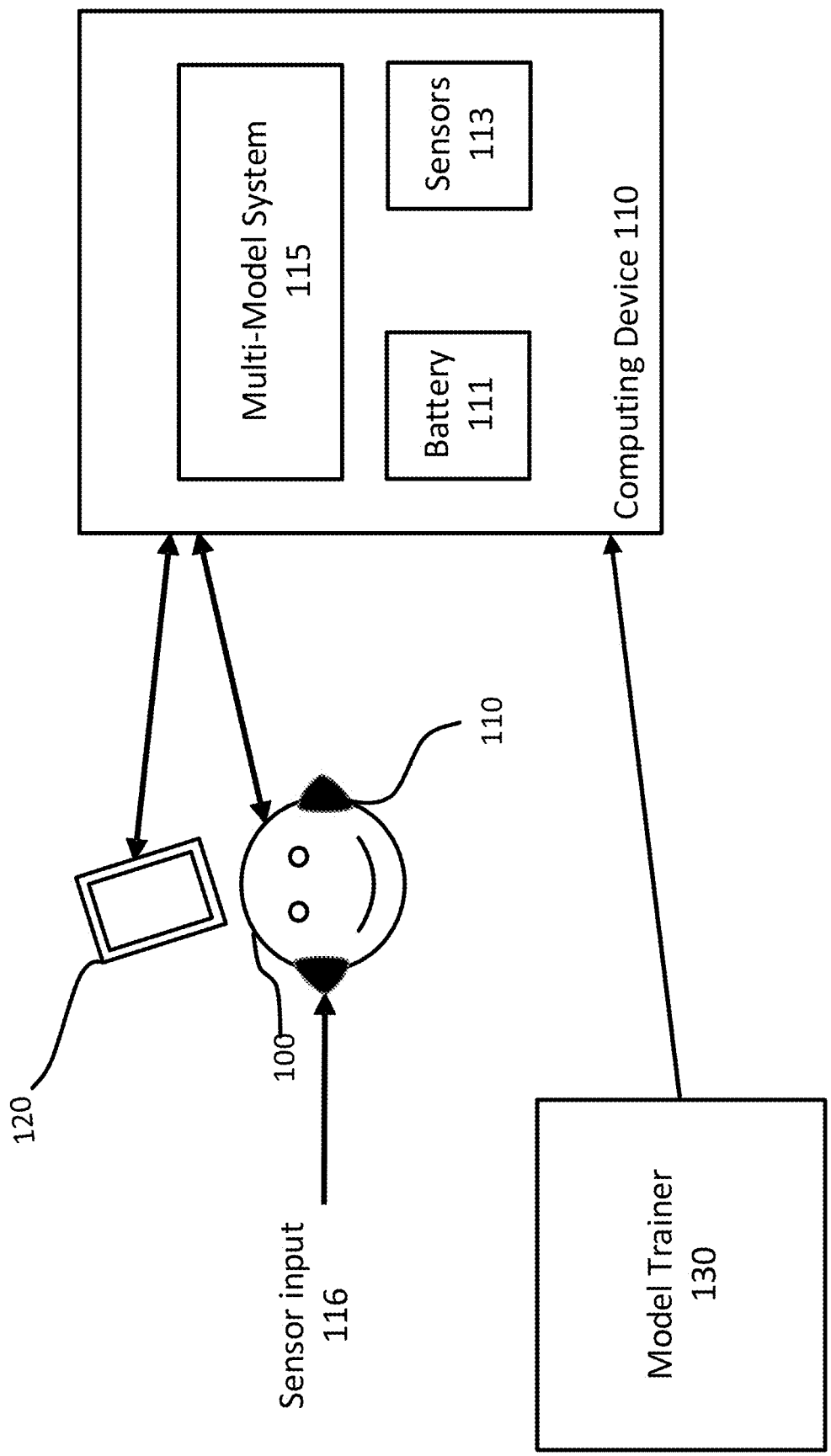
FIG. 1 shows an example computing device implementing a multi-model system according to aspects of this disclosure.

FIG. 1 shows an example computing device 110 implementing a multi-model system 115 according to aspects of this disclosure. The computing device 110 includes a battery 111 and sensors 113. In FIG. 1, the computing device 110 is shown as a pair of wireless earbuds worn by a user 100, although the computing device 110 can be one of a number of other devices, e.g., a watch, wireless headphones, eyeglasses, or a head-mounted display apparatus, such as a virtual reality or an augmented reality headset. In implementations in which the computing device 110 is implemented as a pair of wireless earbuds, the multi-model system 115 can be implemented on one or both earbuds.

The battery 111 can be any conventional battery for powering the computing device 110. In some implementations, the computing device 110 is configured to receive electrical power over-the-air, meaning the computing device 110 can charge the battery 111 to some extent by the received electrical power. In those cases, the power received over the air may be limited to certain power-transfer limits or locations in which the computing device 110 is operated. As described in this specification, the multi-model system 115 can be advantageously implemented to potentially limit power consumption of the computing device 110 even in situations in which wireless electrical energy is freely available, albeit at a limited rate relative to charging the battery 111 inductively or conductively.

Devices, such as the device 110, are often resource-constrained when operating off of a battery. In this specification, a computing device that is resource-constrained generally refers to a condition in which the computing device is operating using limited power, e.g., from a battery or limited wireless charging. A resource-constrained device may perform as well or worse processing data relative to when the device is not resource-constrained, i.e., plugged in to a stable source of power. For example, the computing device 110 may operate at a reduced processing level, i.e., measured in processing cycles per second, when operating only off of battery power from the battery 111, and then return to a normal processing level when plugged in.

In some implementations, the computing device 110 may only be operable when not charging or plugged into a steady source of power. For example, some types of wireless earbuds may only be operable when the earbuds are not currently being charged. In some implementations, the computing device 110 may operate at a normal processing level on or off battery power. In these cases the computing device 110 is still said to be operating in resource-constrained mode when operating off of battery power, because the device 110 can operate only up to the amount of energy stored in the battery 111.

The computing device 110 can switch from resource-constrained to non-resource-constrained modes of operation. In some implementations, the computing device 110 is considered resource-constrained even when plugged into a steady source of energy, e.g., because the source of energy itself might be limited or rationed.

The multi-model system 115 is configured to receive input from at least one of the sensors 113 and to generate an output corresponding to a machine learning task. As described in more detail, below, the multi-model system 115 can implement a gating model, a main model, and an adaptive threshold engine 210. In general, the multi-model system 115 processes input first through the gating model 117, and then through the main model 119 depending on a positive output from the gating model 117, e.g., a prediction of an activity recorded in the sensors input 116.

The multi-model system 115 processes sensor input 116 from the sensors 113 to perform a machine learning task. In performing the task, the multi-model system 115 automatically switches processing between a lower-power gating model 117 and a higher-power, but generally more accurate, main model 119. The switch by the multi-model system 115 can balance how much power the system 115 draws from the battery 111, with a minimum accuracy in performing the machine learning task.

The computing device 110 can parse and pass the sensor input 116 to the multi-model system 115 as a stream of data and according to a sliding window. The sensor input 116 can be a continuous source of data, e.g., an audio stream. The computing device 110 can process the sensor input 116 according to the sliding window as a function of time, e.g., 900 milliseconds of sensor input at a time. Within the sliding window the computing device 110 can process input data according to a predetermined hop size, e.g., 200 milliseconds. The computing device 110 can similarly process other forms of sensor input, e.g., vibrations collected using one or more IMUs, or audio-visual data collected from appropriately configured sensors of the sensors 113. The computing device 110 can buffer the sensor input 116 in the memory 206 up to a certain amount, e.g., the size of the sliding window.

A machine learning task specifies input and output for one or more machine learning models to receive and generate, respectively. In this specification, activity detection refers to a machine learning task that specifies input that includes the sensor input 116 recorded by one or more sensors, e.g., the sensors 113 of the computing device 110, and specifies output as a prediction of an activity recorded in the sensor input 116. In general, machine learning tasks include any form of classification task, i.e., categorizing different targets of interest or determining the presence of absence of a particular target.

For example, the multi-model system 115 can be configured to detect whether the user 100 is speaking, based on processing received sensor input 116 that includes speech from the user 100. In some implementations, the multi-model system 115 is configured to detect specific types of speech. Some examples include detecting whether speech is masculine, feminine, or of a child. The multi-model system 115 can also predict whether detected speech is from the user 100 or another source, e.g., a loudspeaker or a person proximate to the computing device 110 that is not the user.

Activity detection can also include non-speech activity detection. In some implementations, the multi-model system 115 detects whether the user 100 is moving, e.g., shaking their head, exercising, or walking. Activity detection can include detecting activity in absence of another activity, e.g., detecting that the user 100 of the computing device 110 is not speaking but rather coughing, sneezing, drinking, eating, or listening to music. Although the following description refers to activity detection as the machine learning task in some examples, in general any machine learning task for performing a classification on some input data can be applied without loss of generality.

Both the gating model 117 and the main model 119 are trained to perform a machine learning task with an accuracy meeting a minimum accuracy threshold, e.g., 98% accuracy. The model trainer 130, as described below, is configured to train the models 117, 119 to meet or exceed this minimum accuracy threshold. In addition, the model trainer 130 can evaluate the models 117, 119 according to one or more metrics, e.g., recall or false positive rate, to determine the average accuracy at which the models 117, 119 perform under different respective conditions. The minimum accuracy threshold can be defined as a function of the accuracy of the main model 119, for example so that the minimum accuracy threshold is always defined to be lower than the accuracy of the main model 119.

The gating model 117 is trained to meet the minimum accuracy threshold, but generally requires less power than the main model 119 to do so. As described in more detail, below, the model trainer 130 can evaluate an (approximate) number of operations performed by each of the models 117, 119, and tune the gating model 117 so as to perform at the minimum accuracy threshold, but perform overall fewer operations than the main model 119 to do so.

The main model 119 is trained to meet or exceed the minimum accuracy threshold. The main model 119 can be, for example, a state-of-the-art machine learning model trained to perform a particular machine learning task, e.g., activity detection. The main model 119 generally is more accurate on average than the gating model 117, but generally requires more operations—and subsequently, more energy from the battery 111—to process input at inference. The main model 119 can be a machine learning model that, given no resource constraints, would be an ideal candidate for performing the given machine learning task. However, due to the resource constraints of some devices like the computing device 110, it is not always beneficial or optimal to run the main model 119 only. In some implementations and as described below, although the average accuracy of the main model 119 is higher than that of the gating model 117, in some use cases the main model 119 may perform worse, but the overall accuracy of the system 115, i.e., the models 117, 119 together, can stay the same or even be higher than if the models 117, 119 were executed independently.

The multi-model system 115 can process input by switching between the gating model 117 and the main model 119. Because both models 117, 119 are trained to meet the minimum accuracy threshold, the gating model 117 can be used first or generally more frequently than the main model 119 for performing a machine learning task. By using the less resource-taxing gating model 117 first, the multi-model system 115 can save on resource consumption on the device 110. For example, in the case of activity detection, the gating model 117 can process and filter out input that is not indicative of an activity by the user 100. In this way, the more resource-intensive main model 119 can be selectively invoked to process the sensor input 116 after the gating model 117 has detected an activity.

After initial processing by the gating model 117, the main model 119 can process the sensor input 116 beginning at the sliding window processed by the gating model 117. In some implementations, the main model 119 receives the output of the gating model 117, and continues processing the sensor input 116 from the next sliding window after the initial sliding window processed by the gating model 117. The main model 119 can process the same initial data as the gating model 117, for example, to verify the prediction of the gating model 117 before continuing processing. In some implementations, the main model 119 can rely on the initial output of the gating model 117 instead, and can continue processing new data.

The computing device 110 can generate output and transmit the output to a second computing device 120 of the user 100, or the user 100 directly. The second computing device 120 can be, for example, a mobile phone communicatively coupled to the computing device 110. In some implementations, the computing device 110 can transmit data to the second computing device 120, which the second computing device 120 can receive and can process further. The second computing device 120 in turn can transmit data back to the computing device 110. For example, the second computing device 120 can be configured to receive a phone call, and transmit audio data back and forth between the second computing device 120 and the computing device 110.

The output from the computing device 110 can include output in response to the multi-model system 115 processing the sensor input 116 and detecting an activity performed by the user 100. The output can be in the form of one or more actions performed by the computing device 110. The actions performed by the computing device 110 as output can vary depending on the type of activity detected by the multi-model system 115.

For example, the multi-model system 115 can be configured to detect whether the user 100 is speaking a command phrase into the computing device 110. The computing device 110 can further process the sensor input 116 to identify what the command was, e.g., "play music." In response, the computing device 110 can perform one or more actions for playing music through speakers of the device 110.

In some implementations, the computing device 110 passes data representing an activity detected by the multi-model system 115 to the second computing device 120. In those implementations, the second computing device 120 receives data from the computing device 110 indicating an activity detected by the multi-model system 115. The second computing device 120 can additionally process the sensor input 116 or processed data from the multi-model system 115 and cause the computing device 110 to perform actions as part of a response to the detected activity.

Output directly to the user 100 can be in the form of vibrations or sound from speakers implemented in the computing device 110 (not shown). If the system generates output for the second computing device 120, the output can be displayed on a display of the second computing device 120, or in some implementations the output can be produced as sound or vibration through a speaker for the second computing device 120 (display and speaker not shown).

The sensors 113 can be one or more of a variety of different sensors for collecting data from the user 100, a physical environment proximate to the user 100, or both. The sensors 113 can collect sensor data of a variety of different types, including audio signals, optical signals, electromagnetic signals, and data related to the location and orientation of the user 100 or other objects or people proximate to the user 100.

The sensors 113 can include one or more inertial measurement units ("IMUs") e.g., including an accelerometer and/or a gyroscope. In some implementations, the sensors can include a laser Doppler vibrometer that is configured to scan surfaces and detect vibrations on the surface, air conduction microphones, bone conduction microphones, voice accelerometers, or other sensors, such as those that measure vibration through the body of a user. The sensors can be specially tuned based on the physical shape and form factor of the device, as well as based on the relative position of the sensors to the body of the user 100 when the device 110 is worn.

The sensors 113 can include one or more IMUs that include one or more gyroscopes for measuring angular motion of the computing device 110, and can also include one or more accelerometers for measuring linear motion of the computing device 110. Another type of IMU that can be implemented is a voice accelerometer, e.g., a bone conducting microphone, for measuring vibrations caused by the user 100 speaking. Other types of sensors that could be implemented on the computing device 110 include optical sensors, e.g., cameras; electrical sensors, e.g., capacitive sensors; magnetic sensors, e.g., Hall effect sensors; positioning sensors, e.g., compasses; and vibration sensors, e.g., microphones.

The sensors 113 can include sensors of the same type that are implemented on different parts of the computing device 110. For example, in implementations in which the computing device 110 is a pair of wireless earbuds, the sensors 113 can include two or more voice accelerometers, with at least one voice accelerometer in each earbud. The computing device 110 can collect data as part of the sensor input 116 from one or more of these sensors at the same time. In some implementations and as described below, the multi-model system 115 can select which sensors are operating based on the remaining battery-life of the battery 111 and potentially one or more other conditions. Additionally or alternatively, the computing device 110 can selectively operate some or all of the sensors 113 based on whether the computing device 110 is operating in a resource-constrained mode or not.

In implementations in which the computing device 110 is a pair of wireless earbuds, each earbud can include a separate battery, with a separate remaining battery life. In those implementations, the battery-life can refer to the battery-life of either one of the earbuds. The battery-life can also refer to the average remaining battery-life of both earbuds. As described herein, the multi-model system 115 can be implemented on one or both earbuds.

If the multi-model system 115 is implemented on only one earbud, then the remaining battery-life can refer to the remaining battery-life of the earbud implementing the system 115. In some implementations, when the computing device 110 is operating in a resource-constrained mode, one earbud can be configured to collect the sensor input 116, while the other earbud processes the sensor input 116. The earbuds can be configured to communicate data to one another, for example through a physical wired connection or a wireless connection.

In implementations in which the multi-model system 115 is implemented on both earbuds, the computing device 110 can alternate between the model processing earbud, based on, for example, which earbud has the highest remaining battery life. In some implementations, the computing device 110 may alternate model processing between the earbuds, for example to balance remaining battery life evenly between the earbuds. If one earbud is designated as the model processing earbud, the same or other earbud can be configured to collect the sensor input 116.

The sensors 113 can also collect data as part of the sensor input 116 according to different modes of operation. In some implementations, some sensors of the sensors 113 can collect sensor data of a particular type, using more or less energy, e.g., measured by the number of operations for sampling incoming signals, from the battery 111. The quality and other characteristics of the sensor data collected by low-power sensors can vary from characteristics of the sensor data collected during normal operation.

When the computing device 110 is intended to be worn by the user 100, in some implementations IMUs of the sensors 113 can be configured to track angular and/or linear motion of the user 100 or specific body parts of the user 100, e.g., the head or arms of the user 100. When the computing device 110 is implemented as a pair of wireless earbuds, IMUs implemented as part of the sensors 113 can be configured to detect position and movement as between a first wireless earbud and a second wireless earbud. The sensors 113 can also include sensors that track characteristics of the computing device 110, e.g., a remaining battery-life for the battery 111. As described below, the models of the multi-model system 115 can be trained to process features from sensor data collected from a combination of low-power and normally-operating sensors.

One or more of the sensors 113 can be communicatively coupled to the device 110. For example, one or more of the sensors 113 can be implemented directly as part of the device 110, such as IMU sensors installed in the device 110. In other examples, one or more of the sensors 113 can be remote and part of one or more other devices at one or more locations. For example, the remote sensors can be implemented as part of the second computing device 120, or implemented on another device 120. The remote sensors can communicate through a wireless or wired connection to the device 110 to send sensor data recorded by the remote sensors. The sensor data recorded by the remote sensors can form part of the sensor input 116, which can additionally include sensor data collected from one or more other sensors that are implemented as part of the computing device 110.

While some components of the computing device 110 are shown, in some implementations the computing device 110 can include additional or alternative components. Further, the configuration of the computing device 110 is exemplary and not the only way the computing device 110 with the multi-model system 115 can be implemented.

Figure 2:
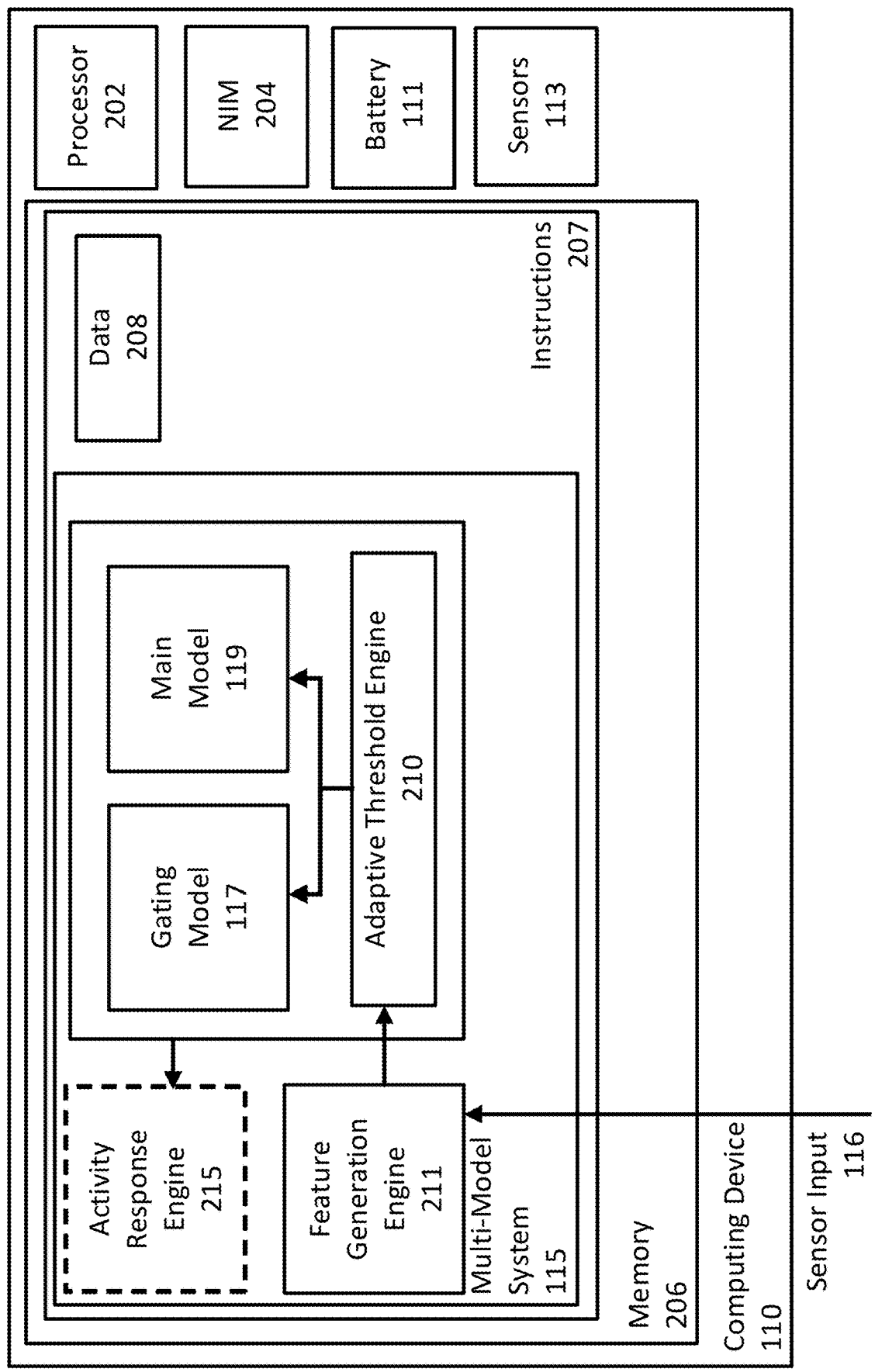
FIG. 2 is a block diagram of an example multi-model system implemented on the computing device.

FIG. 2 is a block diagram of an example multi-model system 115 implemented on the computing device 110. The computing device 110 is shown with the battery 111 and the sensors 113. The computing device 110 also includes a processor 202, and a network interface module ("NIM") 204.

The NIM 204 can be implemented according to any conventional technique for communicatively coupling the computing device 110 with another device, e.g., the second computing device 120. The NIM 204 can support a variety of short- and long-range connections along a variety of different bandwidths, e.g., 2.402 GHz to 2.480 GHz (commonly associated with the Bluetooth® standard), 2.4 GHz, 5 GHz (commonly associated with the Wi-Fi® communication protocol); or with a variety of communication standards, e.g., the LTE® standard for wireless broadband communication.

The processor 202 can be any type of processor and of any type of architecture, e.g., a central processing unit arranged according to a von Neumann architecture, a graphics processing unit, a field programmable gate array, or an application-specific integrated circuit. The computing device 110 can implement a single processor 202, as shown in FIG. 2, or can implement a plurality of processors that can be configured to inter-connect as necessary to perform various operations.

The computing device 110 as shown in FIG. 2 also includes memory 206. The memory 206 stores information that is accessible to the processor 202, and can store instructions 207 and data 208. The instructions 207 can include instructions that, when executed by the computing device 110, causes the computing device 110 to execute the multi-model system 115, including the adaptive threshold engine 210, the gating model 117, and the main model 119. Optionally, the instructions 207 also include instructions that, when executed by the computing device 110, cause the computing device 110 to execute an activity response engine 215.

The adaptive threshold engine 210 is configured to generate and maintain a balance between power consumption by the multi-model system 115 in performing a machine learning task and the accuracy of the output generated by the multi-model system 115. To do so, the adaptive threshold engine 210 can adaptively switch which of the gating model 117 and the main model 119 is used to process the sensor input 116.

If the gating model 117 is selected, the gating model 117 processes the input and generates an output that includes an indication of whether or not the gating model 117 detected an activity being performed. The adaptive threshold engine 210 can always select processing input by the gating model 117 first when the device 110 is operating in a resource-constrained mode, but in other implementations the adaptive threshold engine 210 can switch between the models 117, 119 according to different switching strategies.

If the gating model 117 successfully detects an activity, then the sensor input 116 is sent for processing by the main model 119. If the gating model 117 does not detect an activity, then processing as to the sensor input 116 stops. In this way, the adaptive threshold engine 210 can manage how often the main model 119 is invoked to process the sensor input 116. For example, instead of the main model 119 processing sensor input that is not indicative of any activity performed by the user 100, the computationally less-demanding gating model 117 can be invoked by the adaptive threshold engine 210 to make a prediction responsive to the machine learning task.

The adaptive threshold engine 210 can adjust how data is processed by the multi-model system 115 based on time-dependent and time-independent factors. Time-dependent factors include the remaining battery life of the battery 111. For example, as the battery-level of the battery 111 goes down, the adaptive threshold engine 210 can adaptively process the sensor input 116 more frequently through the gating model 117 first than the main model 119.

In some implementations, the adaptive threshold engine 210 can follow one or more performance thresholds corresponding to the general performance of the gating model 117 in performing a machine learning task under different conditions. In some implementations, the gating model 117 includes a single performance threshold representing the minimum accuracy threshold. When a model operates at a certain performance threshold, then the model is operating under certain conditions that cause the performance of the model to meet the performance threshold. The gating model 117 can require different amounts of energy, e.g., measured through a number of operations and/or the amount of sensors 113 invoked to collect the sensor input 116, to perform the machine learning task at different performance thresholds. The model trainer 130, described below, can be configured to identify these performance thresholds as part of training the models 117, 119.

In response to the remaining battery-life of the battery 111, the adaptive threshold engine 210 can cause the multi-model system 115 go from processing the sensor input 116 within a first performance threshold to a second performance threshold. The second performance threshold can be a lower threshold for accuracy of the gating model 117, but requires less energy from the battery 111 to process. The gating model 117 can have a plurality of different performance thresholds, but in no case is a performance threshold lower than the minimum accuracy threshold. In other words, the multi-model system 115 tolerates some reduction in accuracy to save on energy, for example when the remaining battery-life is low. The adaptive threshold engine 210 can cause the gating model 117 to operate between performance thresholds with relative accuracies that are imperceptibly to the user 100 during operation.

As part of determining whether to switch between the models 117, 119, the adaptive threshold engine 210 can factor in a cost associated with switching processing between different models of the multi-model system 115. The cost can be measured as a number of operations, e.g., necessary read and/or write operations, to switch from processing the sensor input 116 between the gating model 117 and the main model 119.

The adaptive threshold engine 210 can adjust whether the gating model 117 or the main model 119 initially processes input according to a schedule. For instance, if the computing device is operating in a resource-constrained mode, then the adaptive threshold engine 210 can always cause the gating model 117 to process incoming input first, then the main model 119 as necessary. In some implementations, the adaptive threshold engine 210 causes the gating model 117 to process input first for a set number of iterations, and then occasionally switch to the main model 119. The adaptive threshold engine 210 can trigger the switch after a fixed number of iterations, or after a number of iterations relative to the remaining battery-life of the battery 111. For example, as the life of the battery 111 drains, the adaptive threshold engine 210 can prefer processing through the gating model 117 more often than the main model 119.

The adaptive threshold engine 210 can switch between the models 117, 119 randomly, according to different frequencies that are based on a weight that can be predetermined to favor triggering the gating model 117 more often than the main model 119. For example, the adaptive threshold engine 210 can be configured to switch to the gating model 117 according to one frequency, and switch to the main model 119 according to a second frequency. Generally, the frequency at which the gating model 117 is invoked will be greater than the frequency at which the main model 119 is invoked. In implementations that include this schedule for switching between the models, the weight can be chosen based on the relative power consumption of the models 117, 119 and a cost for switching input for processing between the models 117, 119. In general, the weight can be chosen so that the input processed is processed accurately as between the models 117, 119 and within the minimum accuracy threshold, but overall consumes less power than if only the main model 119 was used for processing. In some implementations, the adaptive threshold engine can modify the weight based on the remaining battery-life of the battery 111.

The adaptive threshold engine 210 can switch between the models 117, 119 based on the type of activity detected by the models 117, 119, in implementations in which the machine learning task is activity detection. For example, if the gating model 117 classifies current sensor input as indicative of a particular activity, e.g., speaking, then the adaptive threshold engine 210 can cause the main model 119 to process the current sensor input and/or subsequent sensor input. The main model 119 can continue to process sensor input until detecting a different activity, e.g., not speaking. Then, the adaptive threshold engine 210 can cause processing to switch back to the gating model 117. Operating in this manner can result in improved resource usage even if the main model runs longer than the gating model in processing the sensor input 116.

For example, the resource cost for processing the sensor input 116 when an activity is first detected by the gating model 117 can be significantly higher than processing subsequent input by the main model 119. Subsequent input may also require less processing because calculations, e.g., convolutions in implementations in which the models 117, 119 are convolutional neural networks, can be largely reused from initial calculation.

The adaptive threshold engine 210 can switch between the models 117, 119 according to user-specified parameters. For example, the computing device 110 can be configured to receive input indicating whether the computing device 110 should operate in a resource-constrained mode or not.

Time-independent factors can include the average accuracies of the models 117, 119 under different conditions. The difference in accuracy between the models 117, 119 can be at least based on differences in model architecture, which types of activity are being detected from the sensor input 116, or what types of sensor input 116 are being processed. These time-independent factors can be predetermined, for example when the models 117, 119 are loaded into the memory 206 of the multi-model system 115. As described below, a model trainer 130 can be configured to train the models 117, 119 and in some implementations collect data representing performance thresholds when the models 117, 119 process data under different conditions.

In implementations in which the instructions 207 include instructions for executing the activity response engine 215, the activity response engine 215 is configured to receive output from the multi-model system 115 indicating a detected activity, and to process the output to perform another task, e.g., part of a compound machine learning task as described above with reference to FIG. 1. The activity response engine 215 can also be configured to perform other processing operations on output from the multi-model system 115 that are not related to a machine learning task, e.g., indicate to the user 100 that an activity has been detected and begin tracking a time in which the activity is performed by the user 100. The activity response engine 215 can be an artificial intelligence (AI)-virtual assistant. The virtual assistant can be configured to process commands detected by the multi-model system 115, and perform one or more actions in response to the commands, e.g., playing a certain song, or updating a calendar associated with the user 100.

The data 208 can include data for processing input through the multi-model system 115. For example, the data 208 can include model parameter values, e.g., weights or biases, for executing one or both of the gating model 117 and the main model 119.

The multi-model system 115 can include a feature generation engine 211. In general, the feature generation engine 211 is configured to process incoming sensor data and to generate values for a plurality of features. A feature is a characterization of an input. For example, if the sensor data include audio signals, then a feature of the audio signals can be the frequency of the audio, and a value for that feature can be 100 Hz. The feature generation engine 211 can process raw input data to reduce the dimensionality of the data. For example, the feature generation engine 211 can process input data using one or more processing techniques, e.g., principal component analysis, to obtain a feature value that represents some part of the raw input data. The machine learning models 117, 119, can be configured to process at least a portion of the features generated by the feature generation engine 211, as part of processing the input to detect user activity or to perform another machine learning task.

One type of feature that the feature generation engine 211 can generate relates to different representations of incoming audio data in the sensor input 116. For example, the feature generation engine 211 can generate spectrograms from the incoming audio data. A spectrogram is a visual representation of an input signal over a period of time. The models 117, 119 can be trained to receive input audio data as spectrograms, and use the spectrograms and other optional data to predict whether the user is speaking or performing some other activity. The feature generation engine 211 can generate a variety of different types of spectrograms and other visual representations of input audio data, including Mel spectrograms, linear spectrograms, and Mel Frequency Cepstral Coefficients (MFCCs). The feature generation engine 211 can also process incoming audio data, e.g., by applying a Fourier transform, to convert a representation of the signal in time to a decomposition of frequencies represented in the audio data.

The feature generation engine 211 can generate features from a same type of sensor data recorded by different sensors of the sensors 113. For example, the computing device 110 may include two or more of the same sensors positioned along different parts of the device 110. In one case, the computing device 110 is a pair of wireless earbuds, and each earbud can separately house a voice accelerometer sensor or another type of sensor. At least because of differences in the physical positioning as between the sensors, these sensors can collect different but strongly correlated data. Using this correlation, the feature generation engine 211 can generate features that represent not only characteristics from individual input from each voice accelerometer, but also other characteristics or patterns as between the recorded input from both accelerometers.

The feature generation engine 211 can also be configured to generate the same set of features for processing through the models 117, 119. In some implementations, the models 117, 119 are trained to process the same input features. By generating the same set of features instead of different sets for the different models 117, 119 the computing device 110 can perform fewer operations overall and potentially save on energy consumption of the battery.

In some implementations, some or all of the functions described herein with reference to the feature generation engine 211 can be performed on one or more devices that are coupled to the computing device 110. For example, the second computing device 120 can be configured to perform some or all of the processing of the sensor data to generate features for processing by the models 117, 119. In those implementations, the computational cost, such as the number of operations, to sending the raw sensor data and receiving the generated features can be weighed relative to the number of operations required to process the sensor data entirely on the computing device 110.

For example, the computing device 110 may consume less energy through fewer operations by offloading computation of the features to the second computing device 120 or another device. The difference in energy consumption can also be balanced against the potential increase of latency that can be introduced by transmitting data to and from the computing device 110, as opposed to processing the raw sensor data entirely on the computing device 110. For example, the computing device 110 can be configured to offload at least some computation if the relative number of operations performed is lower and the increase in latency to generate the output by the models 117, 119 does not exceed a predetermined latency limit.

The architectures of the gating model 117 and the main model 119 can vary from implementation-to-implementation. Generally, the gating model 117 will consume less power than the main model 119 in processing the sensor input 116 to perform a machine learning task. This requirement can be achieved in a number of ways. The gating model 117 can be implemented so as to require fewer operations to process the sensor input 116 as compared with the main model 119. Assuming each operation requires relatively the same amount of power to perform on the computing device 110, fewer operations can be directly related to less power consumed. In some implementations, the number of operations is approximated or averaged over a set of input.

For example, if one or both of the models 117, 119 is implemented as a random forest model, then different input can require different numbers of operations to perform. For example, different inputs may have different numbers of operations, because leaf nodes are at different depths relative to each other in a component decision tree. In those cases, the gating model 117 can be trained as a model that on average performs fewer operations than the main model 119. The model trainer 130 can specify different hyperparameter values that can directly affect the number of operations to execute each of the models 117, 119. For example, the model trainer can specify that the gating model 117 has fewer trees than the main model 119, and/or specify that the maximum or average depth of each tree in the gating model 117 is smaller on average as compared with the main model 119.

In some implementations, power usage is measured in other ways. For example, power usage can be measured or approximated according to average runtime from input to generated output. Power usage can also factor in power usage of other components of the device 110 that operate as part of processing input through the models 117, 119, e.g., the sensors 113.

One way to achieve fewer operations by the gating model 117 is to generate the gating model 117 as a subset of the main model 119. For example, in some implementations the gating model 117 and the main model 119 are neural networks. The main model 119 can be a deep neural network that includes one or more hidden layers in addition to an input layer and an output layer. The gating model 117, by contrast, can be a shallow network that includes only the input and output layer. Alternatively, the gating model 117 can include hidden layers, but fewer layers overall than the main model 119.

The gating model 117 and the main model 119 can be of two different machine learning architectures. For example, the gating model 117 can be a random forest model, while the main model 119 is a deep neural network. The models 117, 119 can also be trained to process different features generated by the feature generation engine 211. In implementations in which the architectures of the models 117, 119 are different, the models 117, 119 can be trained to perform a given machine learning task using the same set of features generated by the feature generation engine 211. In some implementations the feature generation engine 211 formats the features differently as between the gating model 117 and the main model 119, depending on how the models 117, 119 are implemented. In general, any machine learning architecture for classification can be used for one or both of the models 117, 119, e.g., a Gaussian mixture model, or a logistic regression model.

As another way to achieve fewer operations, the multi-model system 115 can cause different sensors of the sensors 113 to record sensor data when the device 110 is in operation. In some implementations, the sensor input 116 includes sensor data from a subset of the sensors 113, e.g., if the sensors 113 includes two voice accelerometers, only one accelerometer may record sensor data. After the gating model 117 processes the sensor input 116 and generates an output responsive to the machine learning task, e.g., a detected activity, the adaptive threshold engine 210 can cause more of the sensors 113 to begin recording sensor data. The feature generation engine 211 can generate enriched features for the main model 119 to process. Because fewer sensors were in operation while the gating model 117 was processing the sensor input 116, the gating model 117 generally performs the machine learning task with less energy consumed, even in implementations in which the models 117, 119 may have the same architectures.

If the feature generation engine 211 generates a set of features F, then in some implementations the models 117, 119 can be trained to perform the machine learning task using the same features in F. In some implementations, the feature generation engine 211 is trained to process a subset of the features in F. In some implementations, the feature generation engine 211 generates different features for the gating model 117 than for the main model 119.

However the feature generation engine 211 generates the features, the model trainer 130 is configured to train the models 117, 119 such that the gating model 117 requires less power than the main model 119 at inference and meets a minimum accuracy threshold. The model trainer 130 can be implemented on one or more computers in one or more physical locations. In general, the model trainer 130 identifies an architecture and inputs for the models 117, 119 and trains the models 117, 119 in accordance with the general requirements that the gating model 117 consume less power to process input but still meets the minimum accuracy threshold.

In some implementations, the model trainer 130 can also track different thresholds of performances for the gating model 117 and the main model 119. The gating model 117 and the main model 119 can be trained according to a variety of machine learning training techniques by the model trainer 130. The adaptive threshold engine 210 can use these thresholds and a real-time reading of the remaining battery-life of the computing device 110 to adjust at what threshold of performance the gating model 117 operates.

When the machine learning task is activity detection, the model trainer 130 can train the models 117, 119 on a labeled dataset of voice recordings. Each recording can include a variety of data-points and can come from the sensors of the computing device 110 or other devices. The recordings can be of fixed or variable length relative to one another, e.g., 10 second clips. The recordings can be of speech of different types and from different speakers, e.g., from men, women, or children. The recordings can also capture audio from speakers performing different tasks, e.g., conversing, eating, exercising, or generally moving around. The recordings can be labeled according to an activity performed at the exclusion of another activity, e.g., drinking, but not speaking. The recordings can also include noise, such as sounds that are not indicative of any activity to be detected, or sources of speech that are not from a speaker or the user of a computing device, e.g., music. The recordings can also include one or more commands spoken using a command word.

A recording from a speaker over a period of time can be divided into training data as a plurality of clips. The clips can be hand-labeled with the corresponding activity to be detected in the clip, although other techniques for labeling can be applied, such as recording-level annotation. For example, every clip from a recording may be given the same label, or a separately trained model can be used to generate the appropriate labels.

The feature generation engine 211 or another similarly configured engine can process the training data to generate a set of features. The model trainer 130 can train each of the gating models 117, 119 with different subsets of features and evaluate the performance of the models 117, 119 for different inputs.

The model trainer 130 can parse and pass training data to the models 117, 119 in a manner similar to how the computing device 110 can process data according to a window size and a hop size, as described above with reference to FIG. 1. Each portion of the training data within a hop size of a sliding window can be an individual datapoint for training the models 117, 119.

The models 117, 119 can be trained in accordance with assumptions about the nature of the training data. For example, if the training data includes training data representing speech, the models 117, 119 can be trained with certain assumptions about the amount of time needed to transition from a speaking to a non-speaking activity as recorded by the training data. For a non-speech to speech transition, there can exist at least one datapoint recording speech that includes the transition at the end of the sliding window between no speech and speech. For example, the datapoint can exist between the beginning of the window and towards the end of the window. Similarly, for speech to non-speech transition in the training data, there can exist at least one datapoint recording speech that includes the transition at the end of the sliding window between speech and no speech. For example, the datapoint may be between the beginning of the window and towards the end of the window.

The model trainer 130 can train the models 117, 119 according to any one of a variety of learning techniques, such as a supervised learning technique. For example, in implementations in which the models 117, 119 are neural networks, the models 117, 119 can be trained according to a supervised learning technique, such as by processing a dataset of training examples representing sensor input and comparing output of the model in detecting activity against a respective label for each training example.

The error between the predicted output and the expected output can be a function of the difference between the overall accuracy of the models 117, 119 as compared with the expected output, e.g., using an appropriate loss function such as Mean Square Error. The model trainer 130 can perform a technique such as backpropagation to compute gradients of the loss function with respect to the weights of the models 117, 119. Weights for the models 117, 119 can then be updated following gradient calculation, and the process can be repeated for a period of time or until arriving at a target accuracy threshold for the main model 119, and the minimum accuracy threshold for the gating model 117.

The model trainer 130 can jointly train the models 117, 119, or train the models 117, 119 separately. The model trainer 130 can use any of a variety of techniques for generating the gating model 117 from the main model 119. For example, the model trainer 130 can apply a knowledge distillation technique for generating the gating model 117. Knowledge distillation refers to a class of techniques for training a smaller model, e.g., fewer operations and/or layers, to generate the output from a given input that matches or closely approximates the output of a larger, more complex, model.

The model trainer 130 can train the main model 119 and generate the gating model 117 from the main model 119. For example, the model trainer 130 can iteratively prune layers or individual neurons of the main model 119 implemented as a deep neural network, to generate the gating model 117. The model trainer 130 can continue generating the gating model 117 in this way until performing a predetermined number of iterations, or until additional iterations of pruning causes the gating model 117 to perform below the minimum accuracy threshold.

The model trainer 130 can also train the gating model 117 by pruning features or sources of sensor data that the feature generation engine 211 uses to generate features for the gating model 117.

For example, the model trainer 130 can first train the main model 119 to perform the machine learning task. Then, the model trainer 130 can iteratively prune which features are sent as input to the main model 119, and evaluate the model performance after pruning. In this way, the model trainer 130 can identify candidate gating models. The model trainer 130 can continue this process of pruning and evaluation for a predetermined number of iterations, or until model performance falls below the minimum accuracy threshold. The candidate model at the end of this process that still meets the minimum accuracy threshold can be set as the gating model 117.

Similarly, the model trainer 130 can first train the main model 119 to perform the machine learning task, and prune sources of sensor data that make up the sensor input 116. For example, the model trainer 130 can train the main model 119 on training data that includes sensor data from two voice accelerometers of the sensors 113, and then train the gating model 117 on training data that includes sensor data from only one voice accelerometer of the sensors 113. The model trainer 130 can continue this process of pruning and evaluation for predetermined number of iterations, or until model performance falls below the minimum accuracy threshold.

In some implementations and as part of generating the gating model 117, the model trainer 130 can evaluate the performance of the gating model 117 through different iterations. In doing so, the model trainer 130 can identify one or more performance thresholds that can be used by the adaptive threshold engine 210 for determining whether to switch between the models 117, 119. During inference, the gating model 117 can be configured to gate or not process input using certain layers or neurons, depending on the desired performance threshold. Because not processing input through some layers or individual neurons means fewer operations performed overall, the gating model 117 can require less energy to process The model trainer 130 can also train the gating model 117 to process features generated from sensor data recorded from low-power sensors. As described above, in some implementations the computing device 110 can operate one or more of the sensors 113 in a low-power mode. The resulting sensor data from the low-power sensors can vary as compared with sensor data collected during normal operation, but requires less energy from the battery of the computing device overall to obtain.

As described above, the model trainer 130 can evaluate the models 117, 119, e.g., as part of training and to determine whether the models 117, 119 meet or exceed the minimum accuracy threshold, respectively. The training data set as described above can be split, e.g., 80-20, between training data and data for evaluation. The model trainer 130 can evaluate the trained models 117, 119 using the evaluation data. The model trainer 130 can evaluate the output, e.g., evaluate whether the models accurately detected an activity for a given input, according to a variety of different metrics.

One metric that the model trainer 130 can be configured to use compares recall to false positives generated by the models 117, 119 over a period of time, e.g., an hour. Recall generally refers to how often the model accurate classifies input. Recall can be represented as:

$$\frac{\text{\# of true positives}}{(\text{\# of true positives} + \text{\# number of false negatives})}$$

In other words, the recall of a model can represent how often the model accurately detects an activity when an activity is recorded in the sensor input (i.e., the number of true positives) over the number of times the model output indicates a true positive and the number of times the model output indicates that an activity is not detected when in fact an activity was recorded (i.e., the false negative). A recall of 0.5, for example, indicates that the model correctly detects an activity half the time. In general, a model with higher recall performs better than a model with lower recall.

The model trainer 130 can supplement evaluation of the models 117, 119 using additional metrics, in addition to the rate of recall. For example, the model trainer 130 can evaluate the performance of the models 117, 119 according to the false positive rate of output from the model. The false positive rate can be given by:

$$\frac{(\text{\# of false positives})}{(\text{duration of negative data})}$$

In other words, the false positive rate can represent how often the models 117, 119 detect an activity when the sensor input does not record an activity, over a duration of data not recording an activity. The duration can be measured in hours or minutes. For example, if the duration of negative data is measured in hours, then the false positive rate of 6 indicates that the model incorrectly detects an activity in negative data 6 times an hour (or once every ten minutes). In general, a model with a lower false positive rate performs better than a model with a higher false positive rate.

Another metric that the model trainer 130 can use, in addition or as an alternative to recall and false positive rate, is the receiver operating characteristic under curve (ROC AUC). ROC AUC is a metric that can be used in classification models, e.g., models that perform activity detection, which measures the area (the AUC) under a graph (the ROC) plotting a probability that an evaluated model will perform with a given recall and false positive rate. In general, models whose output forms a larger AUC when the corresponding ROC is graph performs better than a model with a smaller AUC.

The model trainer 130 can evaluate the models 117, 119 after training and before the models 117, 119 are loaded into memory of a computing device. The model trainer 130 can evaluate the models 117, 119 according to one or more metrics, e.g., the metrics described above, alone or in combination. The model trainer 130 can evaluate the models 117, 119 by combining recall with false positive rate. For example, the model trainer 130 can evaluate the gating model 117, represented as recall @ false positive rate, e.g., 0.5@6 representing that the gating model 117 has a recall of 0.5 and a false positive rate of 6.

The minimum accuracy threshold, as described above, can be represented as a combination of different metrics, e.g., a minimum recall and false positive rate. The gating model 117 is trained to meet the minimum accuracy threshold and the main model 119 is trained to meet or exceed the minimum accuracy threshold.

The model trainer 130 can evaluate different implementations of the models 117, 119 that can perform better or worse under different metrics. For example, the model trainer 130 can train the gating model 117 that performs at a higher recall at the cost of a potentially higher false positive rate. Depending on the use case, models that have a lower recall but lower false positive rate may be preferred over models that have a higher recall but at the cost of a higher false positive rate. For example, if the machine learning task is speech detection for identifying whether the user 100 is speaking a command, a higher or lower false positive rate relative to recall may be preferred to manage user experience.

The model trainer 130 can evaluate the relative power savings for different evaluated accuracies relative power savings between the gating model and the main model. One way the model trainer 130 can represent the power savings is:

$$\begin{cases} \text{no gating model: } 1.0 * P_{MM} \\ \text{with gating model: } (\%_{pos} * R_{GM} * P_{MM}) + (\%_{neg} * FPR_{GM} * P_{MM}) + \\ \qquad (1.0 * P_{MM}) \end{cases}$$

where $P_{MM}$ is the power usage of the main model, $P_{GM}$ is the power usage of the gating model, e.g., estimated according to number of operations, $R_{GM}$ is the recall of the gating model, $FPR_{GM}$ is the false positive rate of the gating model, $\%_{pos}$ is the proportion of time that is positive, i.e., the proportion of time an activity is occurring, and $\%_{neg}$ is the proportion of time that is negative, i.e., the proportion of time activity is not occurring. The model trainer 130 can approximate $\%_{pos}$ and $\%_{neg}$ for different potential use cases, for example when the computing device 110 is expected to be operated in a noisy environment.

Figure 3:
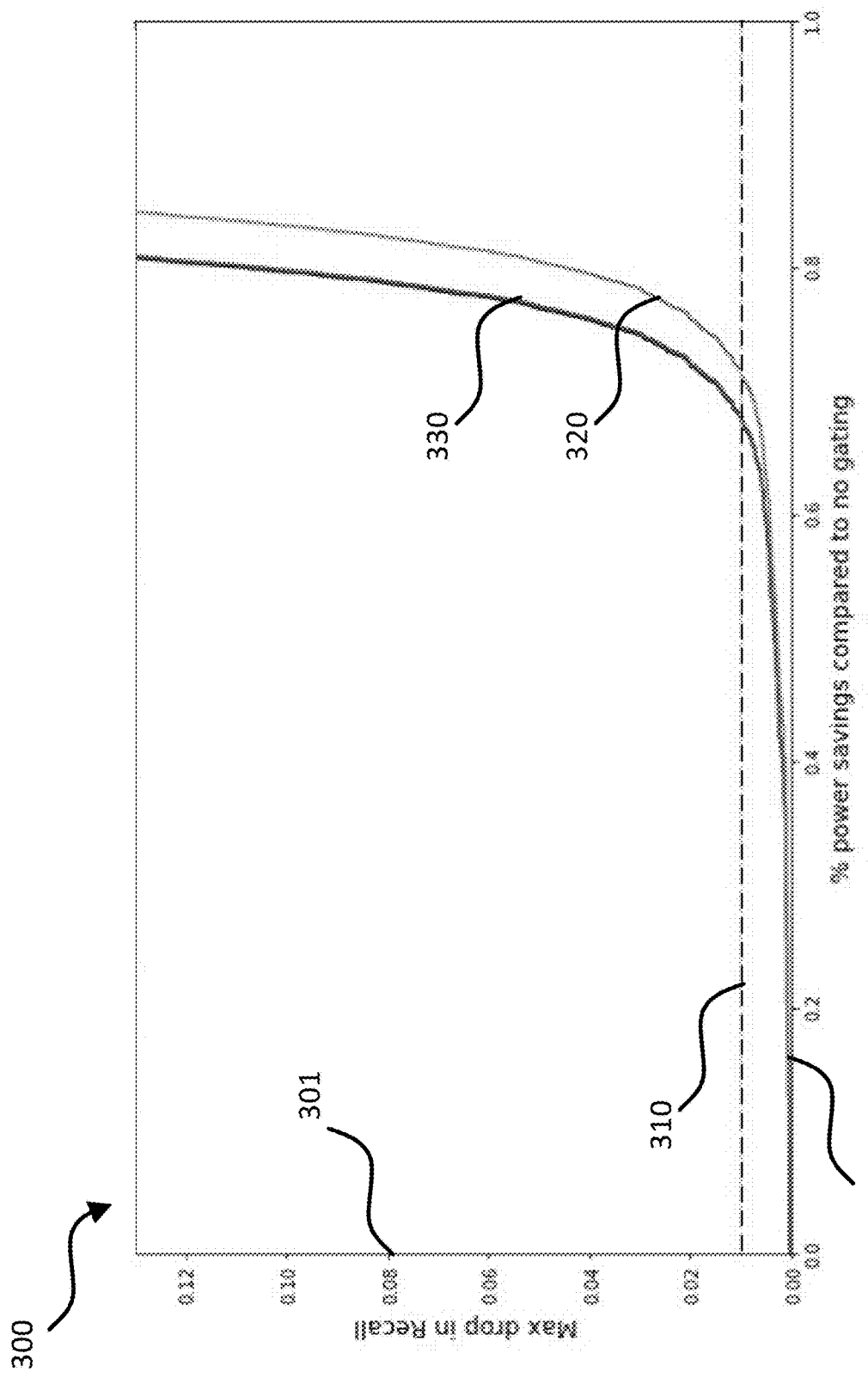
FIG. 3 shows a chart 300 illustrating the relationship between power consumption and model accuracy in an implementation of the multi-model system.

FIG. 3 shows a chart 300 illustrating the relationship between power consumption and model accuracy in an implementation of the multi-model system. The y-axis 301 tracks max drop in recall relative to the recall of the main model 119. The x-axis 302 tracks power savings compared to not operating the gating model 117 at all during inference. Applying the formula above with $\%_{pos}$=10% and $\%_{neg}$=90%, i.e., a predicted average activity rate of 10% versus no activity rate at 90% during operation of the computing device 110, curve 320 shows power savings measured according to power usage measured by runtime, while curve 330 measures power savings according power usage measured by number of operations. Line 310 can represent the minimum accuracy threshold, here approximately 1% lower than the recall rate of the main model 119. As shown in the chart 300, the multi-model system 115 can realize a larger overall savings in power consumption relative to operating the main model 119 during inference. At the same time, the drop in recall can be relatively low and can be so low as to be imperceptible to a user during operation of the device 110.

Note that the chart 300 represents an upper bound of loss in recall as between operating the models 117, 119 as described above, versus operating only the main model 119. In some implementations, for example, false negative results by the gating model 117 may also be false negative results by the main model 119 given the same sensor input. In that case, there would not be a drop in recall because the models 117, 119 operate in the same way in that situation.

In some cases, the overall accuracy of the models 117, 119 together can be better than the individual accuracies of the models 117, 119, alone. For example, some input processed by the gating model may be processed as a true negative, e.g., correctly predicting no activity, where the main model 119 might have predicted a false positive for the same input.

The model trainer 130 can train the models 117, 119 to meet or exceed at performing complementary machine learning tasks. In other words, the gating model 117 can be trained to perform at a relatively higher accuracy than the main model 119 under some use cases, e.g., in detecting speech when the user 100 is making a sound but is not speaking. The gating model 117 can be trained to perform better for particular use cases that for example are more common than others. In some implementations, the main model 119 can continue processing the sensor input 116 after the model 117 detects a particular use-case suited activity, and can rely on the initial output from the model 117 as opposed to re-processing the sensor input 116 in the same sliding window.

In some implementations, the gating model 117 is configured to perform a broader machine learning task, such as speech detection, while the main model 119 is configured to perform a more specific machine learning task, such as identifying specific words and/or phrases spoken by the user 100. In these implementations, the model trainer 130 can train the models 117, 119 on different training data. As an example, the model trainer 130 can train the gating model 117 using training data labeled only for the presence or absence of speech. The model trainer 130 can train the main model 119 on training data that can be labeled with the actual words or phrases spoken in each training example.

In some implementations, the choice of training data for either of the models 117, 119 can depend on a relative tolerance for false positives in the models 117, 119 performing a respective machine learning task. For example, the model trainer 130 can train the gating model 117 to perform a machine learning task in which the training data is not as strongly labeled as training data for another task. An example of this can be training data labeled by the presence/absence of speech versus training data labeled with the presence/absence of specific hotwords or hotphrases for a model to detect. The former can include more false positives, for example training examples labeled as speech but not actually indicative of speech. In this situation, the model trainer 130 can train the gating model 117 for speech detection, as false positives may be more tolerated in the gating model 117 than in the main model 119.

To adjust the relative performance of the models 117, 119 for different use cases, the model trainer 130 can be configured to provide additional training examples as part of training to one model as compared with the other. For example, the gating model 117 can be trained on more training examples of the user 100 coughing versus speaking or performing an activity that requires additional processing by the main model 119.

As another example for adjusting the relative performance of the models 117, 119 for different use cases, the model trainer 130 can be configured to increase the weights or modify the loss function used by the model trainer 130 for either of the models 117, 119 when training the models 117, 119 with training examples representative of a particular use case.

In some implementations, the model trainer 130 can estimate the latency between the multi-model system 115 receiving input and generating an output. For example, in the case of speech to non-speech transition (or vice versa) in training data, a model with high recall is likely to have a latency between 150-350 milliseconds, for example if the average transitionary datapoint includes 150-350 milliseconds of speech, followed by 450-770 milliseconds of no speech in a 900 millisecond window. In other words, the learned behavior of the models 117, 119 in how long to listen to a datapoint to identify a change in activity can be used to measure the latency for the models 117, 119 to process the input, at least because a highly accurate model can wait for the transition between speech to non-speech to occur before generating an output.

Model power consumption can be measured in a variety of ways. In one approach, the model training engine is configured to obtain an average number of operations per input processed by the main model. In some implementations, e.g., when the gating model is a neural network, the number of operations per input will be the same. The model training engine can determine an average number of operations according to a median number of operations run on a test or training dataset.

Figure 4:
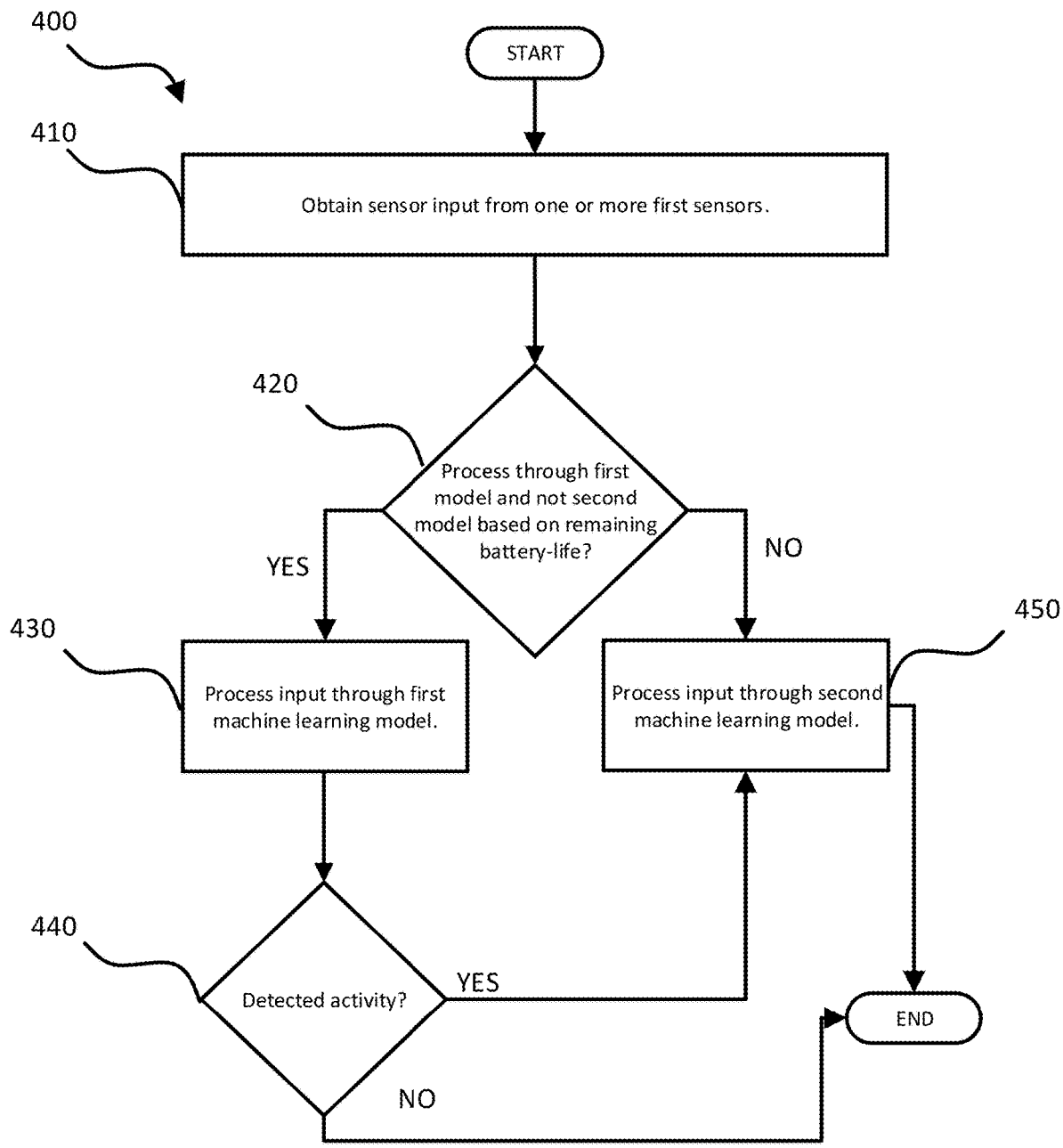
FIG. 4 is a flowchart of an example process for detecting activity on a computing device.

FIG. 4 is a flowchart of an example process 400 for detecting activity on a computing device. The process 400 is described as being performed by a computing device having a battery, one or more processors, and one or more storage devices located in one or more physical locations and programmed in accordance with aspects of this disclosure. For example, the computing device 110 implementing the multi-model system 115, appropriately programmed, can perform the process 400. The process 400 can be performed in different orders, with additional steps added or some steps as shown in the process 400 removed.

The computing device obtains 410 first sensor input from one or more sensors of a plurality of sensors. The first sensor input can include sensor data collected from all or some of the sensors communicatively coupled to the computing device. As described above with reference to FIGS. 1-2, the models 117, 119 can be trained to process data from different combinations of sensors.

The computing device determines 420, based on the remaining-battery life, whether to process the sensor input through a first machine learning model or a second machine learning model implemented on the computing device. The first machine learning model can be the gating model, and the second machine learning model can be the main model. The determination can be made using the adaptive threshold engine of the multi-model system 115. As described above with reference to FIG. 2, the adaptive threshold engine can be configured to automatically select the gating model for processing the input, when the computing device is operating in a resource-constrained mode, e.g., when the computing device is relying on the battery instead of an external source of power.

In some implementations, the adaptive threshold engine processes the sensor input through the gating model whenever the current battery-life is below some predetermined threshold or thresholds, e.g., 99%, 50%, 25%. Also in some implementations and as described above with reference to FIG. 2, the adaptive threshold engine can adaptively switch which of the gating or main models processes the sensor input, based on different configurations for the engine.

If the computing device determines 420 not to process input through the first machine learning model, then the computing device processes 430 input through the second machine learning model. The computing device may determine not to process input through the first machine learning model and process directly by the second machine learning model if the computing device is not operating in a resource-constrained mode.

If the computing device determines 430 to process input through the first machine learning model, the device processes 430 the input and determines 440 whether activity was detected. The determination 440 can change from implementation-to-implementation depending on the specific machine learning task the first and second machine learning models are trained to perform.

If the computing device determines 440 that activity was not detected, the process 500 ends. The process 500 can repeat for new sensor input, e.g., data from an input stream of sensor data further along in a sliding window.

If the computing device determines 450 that activity was detected, the computing device processes 450 input through the second machine learning model. As described above with reference to FIGS. 1-2, input to the second machine learning model processes can be the same or different input than the first machine learning model. Similarly, the features processed by the second machine learning model can be different than the features processed by the first machine learning model, and the sensor data from which the features were generated can also be different between the processing 430 and the processing 450.

Figure 5:
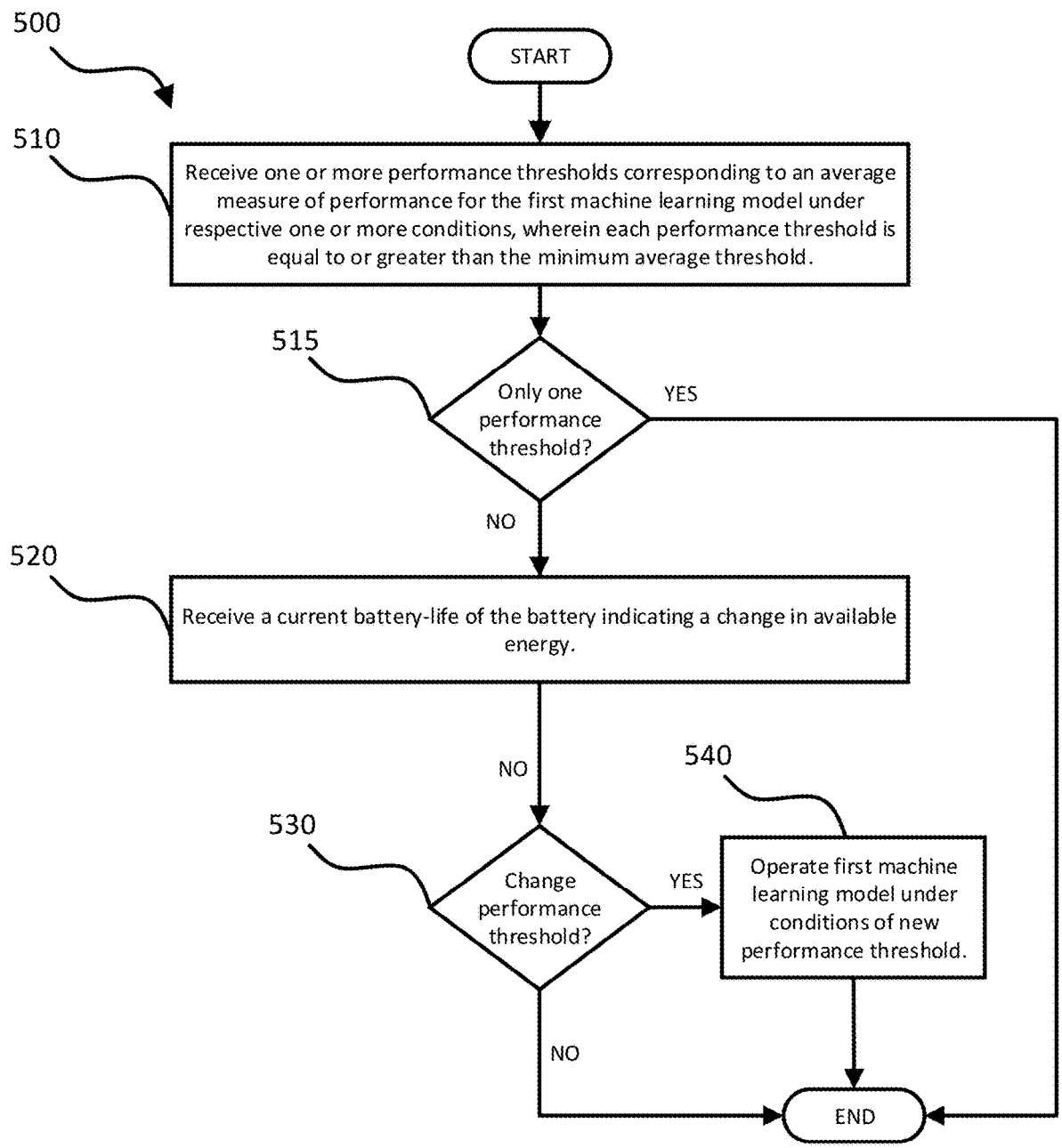
FIG. 5 is a flowchart of an example process for adapting the processing of input data through the gating or main model of a multi-model system.

FIG. 5 is a flowchart of an example process 500 for adapting the processing of input data through the gating or main model of a multi-model system. The process 500 is described as being performed by a computing device having a battery, one or more processors, and one or more storage devices located in one or more physical locations and programmed in accordance with aspects of this disclosure. For example, the computing device 110 implementing the multi-model system 115, appropriately programmed, can perform the process 500. The process 500 can be performed in different orders, with additional steps added or some steps as shown in the process 500 removed.

The computing device receives 510 one or more performance thresholds corresponding to an average measure of performance for the first machine learning model operating under respective one or more conditions. Each performance threshold is equal to or greater than the minimum accuracy threshold. If there is only one performance threshold, then the performance threshold can be the minimum accuracy threshold. As described above with reference to FIGS. 1-2, the model trainer as part of training and evaluating the gating model, can generate the one or more performance thresholds. The model trainer can also send data representing the conditions in which the gating model performs at the different performance thresholds, e.g., using fewer features, or features generated from sensor data from a subset of the sensors 113, or sensors operating at different power levels.

The device can process the gating model at one of the performance thresholds, by operating the gating model under the conditions corresponding to performance at the performance threshold.

The device determines 515 whether the device received only one performance threshold. If yes, then the process 500 ends. Otherwise, the device receives 520 a current battery-life indicating a change in available energy. The device determines 530 whether to change the performance threshold at which the gating model processes the sensor input. As described above with reference to FIG. 1, the device may determine that the gating model process input at a different performance threshold corresponding to more or less energy consumption by the gating model. For example, if the current battery-life falls below 50%, then the device can change the performance threshold at which the gating model operates to allow for more resource efficient processing at the cost of accuracy relative to a previous performance threshold.

If the device determines to change the performance threshold, then the device operates 540 the first machine learning model under conditions of the new performance threshold. For example, if the new performance threshold is achieved by processing fewer features through the gating model, then the computing device is configured to process fewer features through the gating model to generate an output, reducing resource consumption, i.e., by fewer operations required to generate the features, while maintaining accuracy at the new performance threshold.

Particular implementations of the subject matter described in this specification can be implemented so as to realize one or more of the following advantages. A system can automatically switch between a more energy efficient gating model and a corresponding main model to yield improved usage of remaining power for a resource-constrained computing device. The system can sacrifice a relatively imperceptible amount of accuracy in performing a given machine learning task and use substantially less energy by adaptively processing input through the gating model. The improved resource usage can be realized through overall fewer operations performed, including reads or writes to memory, as well as operations performed as part of processing input through the main model, which is generally more accurate than the gating model, but at a higher computational cost.

In addition and innovatively, the system can achieve improved resource utilization despite implementing multiple models each with their own set of operations to be performed in an already resource-constrained environment. The computing device can benefit from improved resource utilization by being able to perform a variety of tasks (and not just the task the system is trained to perform) over the life-time of the device.

The system can adaptively adjust to different performance thresholds that continue to meet an accuracy threshold, in response to remaining battery-life on the resource-constrained device. In some cases, the overall accuracy of the system can be improved, at least because the gating model and the main model are trained to prioritize performing different sub-tasks related to a common machine learning task. For example, in the context of a machine learning task for detecting activity, the gating model can be trained to more accurately detect certain types of activity over the main model, allowing the main model to be trained to focus on detecting other types of activity that may be more computationally expensive to identify but occur less frequently.

Because the gating model and the main model can be trained to hit different accuracy targets, implementation of the system is flexible to different machine learning techniques and architectures as between the gating and main model. Or, in some cases energy usage can be further improved by implementing the gating model as a subset of the main model, allowing the models to share weights which can potentially result in less overall data to access and process on the computing device. This flexibility can also make implementing the techniques described in this specification possible and efficient for resource-constrained wearable devices, such as watches, wireless headsets, or wireless earbuds.

The system can selectively receive input from different sensors implemented on a computing device, which can further reduce resource utilization. For example, the gating model can be trained to process input from a subset of all available sensors on a device, or from one or more of the devices operating at a reduced power level. When the gating model generates an output, e.g., detecting activity by a user, the system can invoke the main model with a richer suite of available sensors, or with sensors operating at a higher (and potentially more sensitive and accurate) power level.

The techniques described in this specification can also allow for improved privacy and data integrity, at least because signals do not have to be sent from the computing device to another device, e.g., a mobile device, laptop, or server. Machine learning tasks that are conventionally performed by remote devices can instead be performed by the computing device implementing the system described in this specification, and can allow for mitigation of data traffic congestion to and from the computing device, which can additionally improve overall performance by consuming less power needed for short- and long-range communication.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generates output according to the input and corresponding to the one or more operations. When a computer program is said to be configured to perform one or more operations, this means that the computer program includes one or more program instructions, that when executed by one or more computers, causes the one or more computers to perform the one or more operations.

A computer program can be written in any type of programming language, and according to any programming paradigm, e.g., declarative, procedural, assembly, object oriented, data-oriented, functional, or imperative. A computer program can be written to perform one or more different functions and to operate within a computing environment, e.g., on a physical device, virtual machine, or across multiple devices. A computer program can also implement functionality described in this specification as performed by a system, engine, module, or model. In some implementations, aspects of this disclosure are implemented on one or more computer-readable storage media encoded with computer program instructions that cause a computing device to perform operations for activity detection with multi-modal sensing.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the

The invention claimed is:

1. A computing device comprising:
   a battery, and
   one or more processors configured to:
      obtain first sensor input from one or more first sensors,
      determine, based on at least a battery-life of the battery, whether to process the first sensor input through a first machine learning model or a second machine learning model,
         wherein the first machine learning model is trained to generate output with an average accuracy meeting a minimum accuracy threshold, and
         wherein the second machine learning model is trained to generate output with an average accuracy exceeding the minimum accuracy threshold; and
      in response to determining to process the first sensor input through the first machine learning model, generate a first output using the first machine learning model, the first output predicting whether the first sensor input recorded an activity.

2. The computing device of claim 1, wherein the one or more processors are further configured to:
   when the first machine learning model predicts that the first sensor input recorded an activity, process second sensor input obtained from one or more second sensors through the second machine learning model to generate a second output predicting whether the second sensor input recorded the activity.

3. The computing device of claim 2, wherein the first machine learning model requires fewer operations to process the first sensor input than the second machine learning model requires to process the second sensor input.

4. The computing device of claim 2, wherein the second sensor is different from each of the one or more first sensors.

5. The computing device of claim 2,
   wherein the first sensor input is obtained from a first sensor of the one or more first sensors operating at a first power level; and
   wherein the second sensor input is at least partially obtained from the first sensor operating at a second power level higher than the first power level.

6. The computing device of claim 2, wherein the computing device further comprises a display, and
   wherein the one or more processors are further configured to determine, from the second output, that the second machine learning model predicted that the second sensor input recorded an activity, and in response generate and transmit a third output to a display of the computing device.

7. The computing device of claim 2,
   wherein the first machine learning model and the second machine learning model are trained to perform a machine learning task, wherein the machine learning task comprises detecting a plurality of types of activities recorded by at least one sensor of the one or more first sensors and the one or more second sensors; and
   wherein the first machine learning model is trained to detect at least one type of the plurality of types with an average accuracy greater than the second machine learning model.

8. The computing device of claim 1, wherein the computing device is further configured to:
   receive a current battery-life of the battery indicating a change in available energy stored in the battery; and
   determine to process the first sensor input through the first machine learning model:
      at a first frequency in response to the current battery-life indicating a change in more available energy stored in the battery, and
      at a second frequency in response to the current battery-life indicating a change in less available energy stored in the battery, wherein the first frequency is greater than the second frequency.

9. The computing device of claim 1, wherein the one or more processors are further configured to:
   receive one or more performance thresholds corresponding to an average measure of performance for the first machine learning model under respective one or more conditions and that are equal to or greater than the minimum average threshold;
   receive a current battery-life of the battery indicating a change in available energy stored in the battery;
   determine, based at least on the current battery-life, whether to cause the first machine learning model to perform at a level of performance meeting a performance threshold of the one or more performance thresholds; and
   in response to the determination to cause the first machine learning model to perform at the level of performance, cause the first machine learning model to operate under respective one or more conditions for the performance threshold.

10. The computing device of claim 1,
    wherein the first and the second machine learning models are neural networks, the first machine learning model having a first plurality of layers, and the second machine learning model having a second plurality of layers that is a subset of the first plurality of layers.

11. The computing device of claim 1, wherein the first machine learning model is of a different model architecture than the second machine learning model.

12. A method comprising:
    obtaining, by a computing device, first sensor input from one or more first sensors;
    determining, based on at least a battery-life of a battery, whether to process the first sensor input through a first machine learning model or a second machine learning model,
       wherein the first and second machine learning models are implemented by the computing device,
          wherein the first machine learning model is trained to generate output with an average accuracy meeting a minimum accuracy threshold, and
          wherein the second machine learning model is trained to generate output with an average accuracy exceeding the minimum accuracy threshold; and
       in response to determining to process the first sensor input through the first machine learning model, processing the first sensor input through the first machine learning model to generate a first output predicting whether the first sensor input recorded an activity.

13. The method of claim 12, further comprising:
    processing second sensor input obtained from one or more second sensors through the second machine learning model when the first machine learning model predicts that the first sensor input recorded an activity, to generate a second output predicting whether the second sensor input recorded the activity.

14. The method of claim 13, wherein the first machine learning model requires fewer operations to process the first sensor input than the second machine learning model requires to process the second sensor input.

15. The method of claim 13, wherein the method further comprises obtaining the second sensor input, including obtaining sensor input from a second sensor that is different from each of the one or more first sensors.

16. The method of claim 13,
wherein obtaining the first sensor input comprises obtaining sensor input from a first sensor of the one or more first sensors operating at a first power level; and
wherein the second sensor input is at least partially obtained by the first sensor operating at a second power level higher than the first power level.

17. The method of claim 13,
wherein the computing device further comprises a display, and
wherein the method further comprises determining, from the second output, that the second machine learning model predicted that the second sensor input recorded an activity, and in response generating and transmitting a third output to a display of the computing device.

18. The method of claim 12, wherein determining to process the first sensor input through the first machine learning model comprises:
receiving a current battery-life of the battery indicating a change in available energy stored in the battery; and
determining to process the first sensor input through the first machine learning model:
a first frequency in response to the current battery-life indicating a change in more available energy stored in the battery, and
at a second frequency in response to the current battery-life indicating a change in less available energy stored in the battery, wherein the first frequency is greater than the second frequency.

19. The method of claim 12, wherein determining to process the first sensor input through the first machine learning model comprises:

receiving one or more performance thresholds corresponding to an average measure of performance for the first machine learning model under respective one or more conditions and that are equal to or greater than the minimum average threshold;
receiving a current battery-life of the battery indicating a change in available energy stored in the battery;
determining, based at least on the current battery-life, whether to cause the first machine learning model to perform at a level of performance meeting a performance threshold of the one or more performance thresholds; and
in response to determining to cause the first machine learning model to perform at the level of performance, causing the first machine learning model to operate under respective one or more conditions for the performance threshold.

20. One or more non-transitory computer-readable media storing instructions that when executed by one or more processors of a computing device, causes the one or more processors to perform operations comprising:
obtaining first sensor input from one or more first sensors of a plurality of sensors,
determining, based on at least a battery-life of a battery, whether to process the first sensor input through a first machine learning model or a second machine learning model,
wherein the first and second machine learning models are implemented by the computing device,
wherein the first machine learning model is trained to generate output with an average accuracy meeting a minimum accuracy threshold, and
wherein the second machine learning model is trained to generate output with an average accuracy exceeding the minimum accuracy threshold; and
in response to determining to process the first sensor input through the first machine learning model, processing the first sensor input through the first machine learning model to generate a first output predicting whether the first sensor input recorded an activity.

* * * * *